US012802135B2

United States Patent

(12) United States Patent
Seif et al.

(10) Patent No.: US 12,802,135 B2
(45) Date of Patent: Nov. 17, 2026

(54) SYSTEM AND METHOD FOR ALLOCATION AND PERIODIC DISTRIBUTION OF RETIREMENT CAPITAL

(71) Applicants: Purpose Investments Inc., Toronto (CA); Longevity Funds International Inc., Toronto (CA)

(72) Inventors: Som Seif, Toronto (CA); Vlad Tasevski, Toronto (CA); Alexander William Baluta, Toronto (CA); Thomas Blair Astle, Toronto (CA); Paul Anthony Haefele, Toronto (CA)

(73) Assignees: Purpose Investments Inc., Toronto (CA); Longevity Funds International Inc., Toronto (CA)

(*) Notice: Subject to any disclaimer, the term of this patent is extended or adjusted under 35 U.S.C. 154(b) by 97 days.

(21) Appl. No.: 18/514,353

(22) Filed: Nov. 20, 2023

(65) Prior Publication Data

US 2024/0087036 A1 Mar. 14, 2024

Related U.S. Application Data

(63) Continuation of application No. PCT/CA2021/050689, filed on May 20, 2021.

(51) Int. Cl.
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
CPC ............................... G06Q 40/06; G06Q 40/04
See application file for complete search history.

(56) References Cited

U.S. PATENT DOCUMENTS 7,752,063 B2 * 7/2010 Klein .................... G06Q 40/03 705/4
8,660,866 B1 * 2/2014 Coleman ................ G06Q 40/08 705/30

(Continued)

FOREIGN PATENT DOCUMENTS

AU 2007100594 A4 * 8/2007
CA 2935847 C * 10/2023 ............ G06Q 40/06

OTHER PUBLICATIONS

Milevsky et al.: Equitable Retirement iIncome Tontines: Mixing Cohorts Without Discriminating, Oct. 28, 2016, pp. 1-41 (Year: 2016).*

(Continued)

*Primary Examiner* — Bijendra K Shrestha

(57) ABSTRACT

Provided herein are a system and method for investing, allocating and periodically distributing pooled capital between investors sorted into a plurality of cohorts based on one or more of age, gender, and investor type. The system and method described herein may periodically distribute to investors capital generated from investment returns and mortality of the investors, as will be described in greater detail below. The system may include at least one computing device that provides a computing platform to enable fund managers and, in some embodiments, individual or retail investors, to interface with the system. The platform may guide individual investors through an onboarding process involving collection of information about the investor, such as age, gender and investor type.

19 Claims, 6 Drawing Sheets

System for participating in longevity fund

(56) References Cited

U.S. PATENT DOCUMENTS

| | | | | |
|---|---|---|---|---|
| 2011/0258140 A1* | 10/2011 | Shemtob | G06Q 40/06 | 705/36 R |
| 2012/0158612 A1* | 6/2012 | Robertson | G06Q 40/00 | 705/36 R |
| 2012/0215722 A1* | 8/2012 | Finfrock | G06Q 40/06 | 705/36 R |
| 2014/0229402 A1* | 8/2014 | Caron | G06Q 40/08 | 705/36 R |
| 2020/0143480 A1* | 5/2020 | Strother | G16H 40/20 | |
| 2022/0261913 A1* | 8/2022 | Wadler | G06Q 40/06 | |

OTHER PUBLICATIONS

Milevsky et al.: Equitable Retirement Income Tontines: Mixing Cohorts Without Discriminating, Oct. 28, 2016, pp. 1-41 (Year: 2016).*

De Klerk, Antoine Making under Uncertainity and Risk: A Retiree's Perspective on Choosing between Pension Options, 2017, pp. 1-12 (Year: 2017).*

Chao. S.; International Search Report from corresponding PCT Application No. PCT/CA2021/050689; search completed Jan. 25, 2022.

* cited by examiner

FIG. 1: System for participating in longevity fund

SYSTEM AND METHOD FOR ALLOCATION AND PERIODIC DISTRIBUTION OF RETIREMENT CAPITAL

CROSS-REFERENCE TO RELATED APPLICATIONS

The present application is a continuation of International PCT Application No. PCT/CA2021/050689 filed on May 20, 2021 incorporated herein by reference in its entirety.

TECHNICAL FIELD

The following relates to systems and methods for allocation and distribution of retirement capital.

BACKGROUND

It is generally recognized that individuals are increasingly required to take greater responsibility for planning their retirement savings. Moreover, as life expectancies continue to increase, uncertainties arise when planning for retirement, as it can be difficult to know how long savings will need to last. This is called "longevity risk," or the risk of outliving your assets.

A defined benefit pension plan is a type of pension plan in which an employer/sponsor promises a specified pension payment, lump-sum or combination thereof on retirement that may be predetermined by a formula based on the employee's earnings history, tenure of service and age, rather than depending directly on individual investment returns. Traditionally, many governmental and public entities, as well as a large number of corporations, provide defined benefit plans. Defined benefits plans have been declining in popularity due to issues such as aging workforce, high pension administration cost and increasing occurrence of plans being underfunded.

Defined contribution plans, in which employees contribute a fixed amount or a percentage of their paychecks to an account that is intended to fund their retirements, have been growing in popularity relative to defined benefit plans. Employers may in some cases match a portion of employee contributions as an added benefit. These plans typically place restrictions that control when and how employees can withdraw from their savings.

It is recognized that there exists a need for an improved retirement savings approach.

SUMMARY

Provided herein are a system and method for investing, allocating and periodically distributing pooled capital between investors sorted into a plurality of cohorts based on one or more of age, gender, and investor type. The system and method described herein may periodically distribute to investors capital generated from investment returns and mortality of the investors, as will be described in greater detail below. The system may include at least one computing device that provides a computing platform to system administrators, such as fund managers, to manage and oversee a longevity fund. In some embodiments, individual/retail investors may directly interface with the system via a computing platform.

In one aspect, there is provided a system for allocating and periodically distributing invested pooled capital between investors, the system comprising: at least one computing device configured to provide a computing platform, the computing platform providing: an investor module providing an interface for communicating with investor devices to obtain investor data; an administrator module providing an interface for communicating with administrator devices, the administrator module being configured to allocate returns of the pooled capital funds for periodic distribution to investors, the returns being reliant upon investment returns and the mortality of the investors; and a database storing the investor data; and a custodian database accessible by the administrator module and configured to receive data concerning the pooled capital.

In an implementation, the administrator module is configured to receive data from actuarial software configured to analyze the investor data and project mortality of the investors.

In another implementation, the investor module comprises a graphical user interface for interacting with investor devices, the investor module being configured to prompt investor devices to input investor information to populate the database.

In yet another implementation, the computing platform is configured to automatically sort each investor into a plurality of cohorts based on the investor data.

In yet another implementation, the investor module is configured to carry out the automatic sorting of the investors into cohorts.

In yet another implementation, the cohorts are defined based on investor age and/or gender.

In yet another implementation, the pooled capital is invested in a fund holding units of another fund or a plurality of financial instruments.

In another aspect, there is provided a method for allocating and periodically distributing invested pooled capital between investors, the method comprising: providing at least one computing device configured to provide a computing platform, the computing platform providing: an investor module providing an interface for communicating with investor devices to obtain investor data; an administrator module providing an interface for communicating with administrator devices, the administrator module being configured to allocate returns of the pooled capital funds for periodic distribution to investors, the returns being reliant upon investment returns and the mortality of the investors; and a database storing the investor data; and a custodian database accessible by the administrator module and configured to receive data concerning the pooled capital.

In an implementation, the administrator module is configured to receive data from actuarial software configured to analyze the investor data and project mortality of the investors.

In another implementation, the investor module comprises a graphical user interface for interacting with investor devices, the investor module being configured to prompt investor devices to input investor information to populate the database.

In yet another implementation, the computing platform is configured to automatically sort each investor into a plurality of cohorts based on the investor data.

In yet another implementation, the investor module is configured to carry out the automatic sorting of the investors into cohorts.

In yet another implementation, the cohorts are defined based on investor age and/or gender.

In yet another implementation, the pooled capital is invested in a fund holding units of another fund or a plurality of financial instruments.

BRIEF DESCRIPTION OF THE DRAWINGS

Embodiments will now be described with reference to the appended drawings wherein.

DETAILED DESCRIPTION

Figure 1:
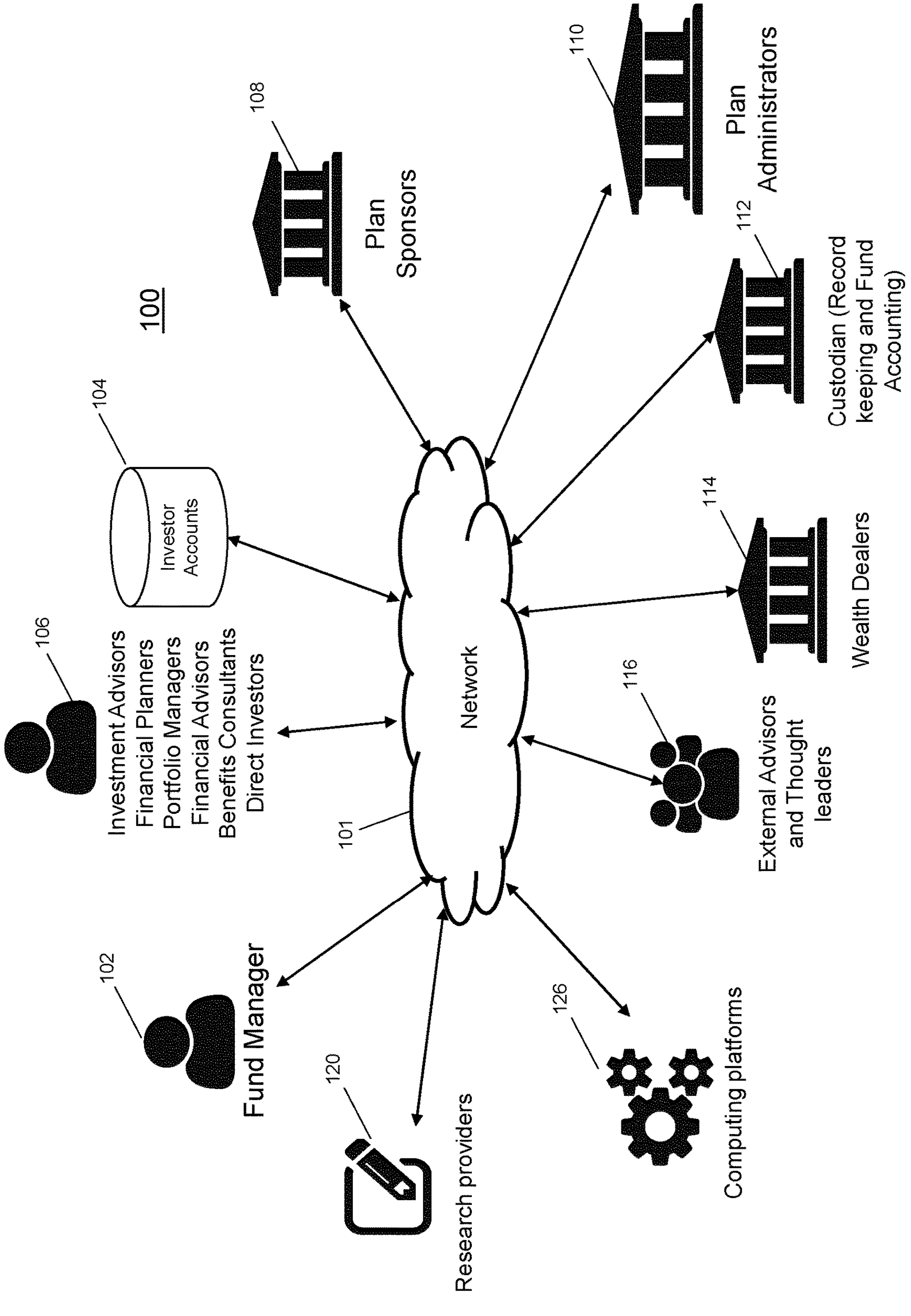
FIG. 1 is a schematic diagram of a system for allocation and period distribution of retirement capital.

Provided herein are a system and method for allocation and periodic distribution of retirement capital. The system and method may utilize longevity risk pooling in combination with conventional investment strategies and thus may provide mortality returns, or credits on top of investment returns. Pooling longevity risk may offer the assurance of annuity-like lifetime payouts in a way not possible with typical retirement investments.

In application, the system and method described herein may provide employers with the ability to offer defined benefit-like employee pension plans that may be less likely to become underfunded. The system and method may also enable defined contribution plan sponsors to offer participants an option that may provide the assurance of annuity-like lifetime income while avoiding the fiduciary liability and counterpart risk associated with selecting an insurance company as guarantor. Further, the system and method enable individual investors to easily access a retirement investment plan which may increase their returns compared to traditional long term or retirement investment plans, without increasing investment risk.

Some potential investors may avoid or be unaware of financial retirement vehicles that pool longevity risk due to the form in which they are currently offered, such as in the form of closed end funds which may have barriers to entry and/or exit. For example, some existing forms of such funds may prevent participants from accessing/withdrawing unpaid capital (even upon death), and accept only participants within a narrow age range and/or having a certain minimum account balance. Additionally, individuals may not be able to access such products without professional assistance.

Provided herein are a system and method for investing, allocating and periodically distributing pooled capital between investors sorted into a plurality of cohorts based on one or more of age, gender, and investor type. The system and method described herein may periodically distribute to investors capital generated from investment returns and mortality of the investors, as will be described in greater detail below. The system may include at least one computing device that provides a computing platform to enable fund managers and, in some embodiments, individual or retail investors, to interface with the system. As set out in greater detail below, individual investors may participate in the system described herein by directly interfacing with a platform included in the system. The platform may guide individual investors through an onboarding process to obtain information about the prospective investors, and may use this information as an input to determine eligibility of the prospective investors. As such, retail investors who are interested in participating in a modernized, easily accessible fund which may combine longevity pooling returns and conventional investment returns, and who do not have a financial advisor and/or who do not subscribe to an employer benefit plan may be particularly drawn to the system described herein. Furthermore, financial or investment advisors may offer this product to their clients and plan sponsors/administrators may offer this product as an option for their plan members.

Turning now to the figures, FIG. 1 schematically illustrates a general system 100 for investing, allocating and periodically distributing pooled retirement capital between investors. The system 100 may comprise a fund manager 102, investor accounts 104, investors/participants 106 (e.g. investment advisors, financial planners, external portfolio managers, financial advisors, benefits consultants or individual/retail investors), research providers 120 (e.g. market researchers, actuarial consulting firms, etc.), wealth dealers 114, external advisors and thought leaders 116, one or more custodians 112 for record keeping and fund accounting, benefit plan administrators 110 and benefit plan sponsors 108. The system 100 may further comprise one or more computing platforms 118 to enable individuals to access and participate in the method carried out by the system 100. The system 100 is depicted in a simplified manner for ease of illustration of the parties that may participate in the system 100. The parties may each have one or more computing devices that are communicatively coupled to one another across a network 101.

Figure 2:
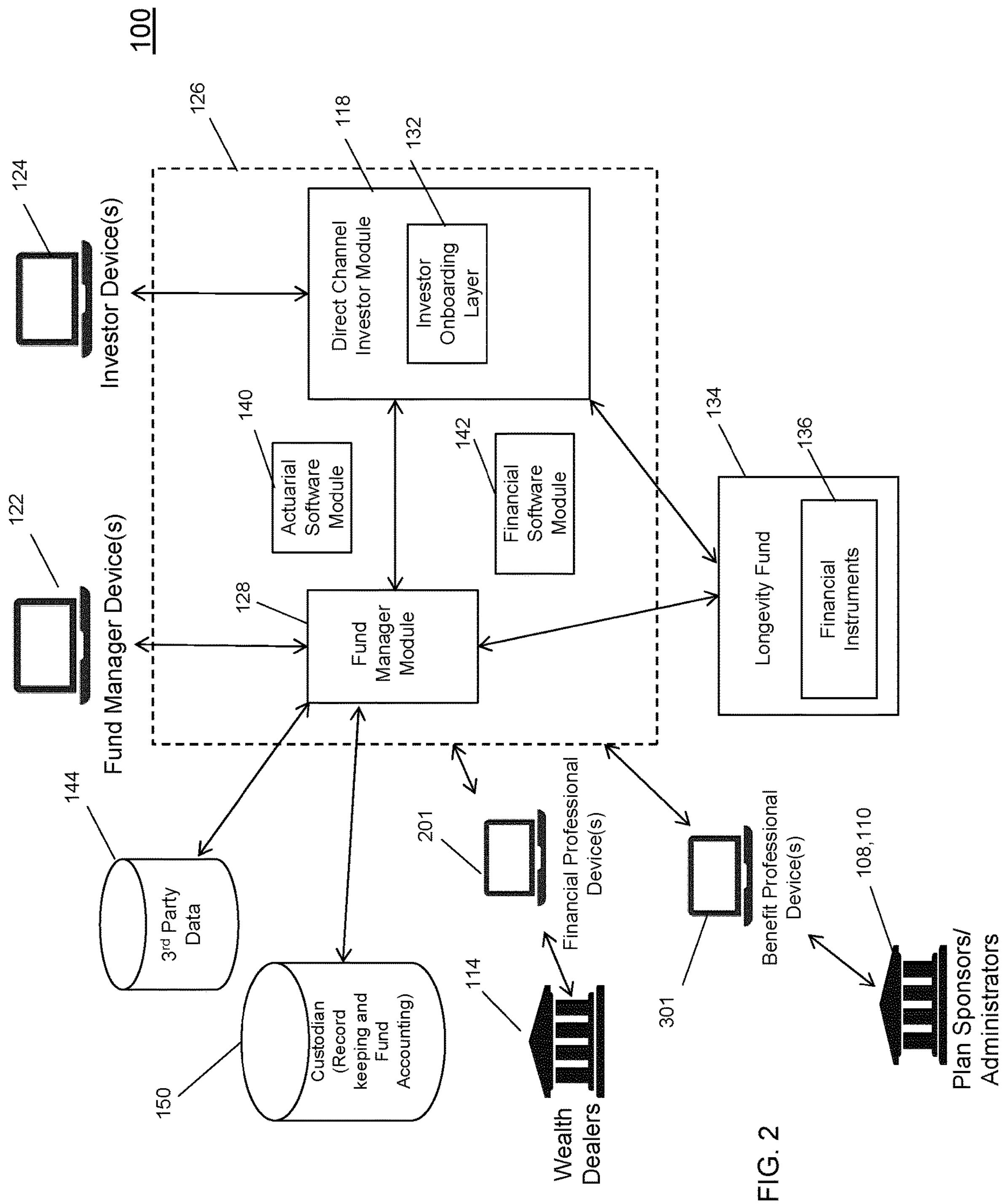
FIG. 2 is a schematic block diagram depicting an example embodiment of a computing platform included in the system of FIG. 1.

The system 100 may include at least one computing device such as a server device to provide a computing platform 118 (see FIG. 2). The computing platform 118 may create an ecosystem or environment for prospective investors, fund managers and other parties to access data and information necessary to participate in or manage onboarding, investment, allocation and periodic distribution of capital.

The platform 118 may include a direct channel investor module 118, and an administrator, or fund manager module 128. The fund manager module 128 may also be referred to as a forecast module 128. The direct channel investor module 118 may include an investing onboarding layer 132 which may enable investor devices 124 to access the system. The fund manager module 128 may be accessed by fund manager devices 122 which may also access and have administrative permissions over the direct channel investor module 118. The fund manager module 128 may include or have access to a financial modeling software module 140 and an actuarial calculation software module 142 which may be used in combination to project returns of pooled capital from the investors. Although not shown, parties/components including, but not limited to, the platform 118, fund manager module 128, investor module 118, plan sponsors/administrators 108,110, and wealth dealers 114 may have access to investor accounts 104 from which capital can be obtained to purchase shares, or to which capital can be returned if shares are redeemed (described in greater detail below).

Generally, the platform 118 may be accessed by the fund manager device(s) 122 and investor device(s) 124 using any suitable medium that enables user interactivity with a corresponding module within the platform 118, such as an app or web browser. An example of such medium is a user interface (UI) provided by way of a web browser and can be integrated with or otherwise communicable with one or more server-sided entities or services that enable provision, dissemination, tracking, and communications within a platform or system level environment. The plan sponsors/administrators 108,110 and wealth dealers 114 may place purchase orders by communicating with the fund manager 102 directly, e.g., over the phone or by email (not shown), and/or by communicating with the computing platform 126.

The platform 118 may have access to a longevity fund 134 holding financial instruments 136 including, but not limited to, stocks, bonds, and/or derivatives. The fund 134 may also hold one or more of exchange-traded funds and mutual funds. The fund manager module 128 may be configured to retrieve and/or receive data from internal and/or external databases, such as third party data from a third party database 144 from, e.g., research providers 120. The fund manager module 128 may be further configured to access the fund 134 and purchase or sell its shares. In this example embodiment, the system 100 comprises a custodian database 150, and the fund manager module 128 may be configured to communicate with such database 150 which may perform record keeping and fund accounting. The system 100 may be configured in alternative ways, or may have different data architecture structures, to provide the platform 118 with access to the database 150 and/or one or more internal or external databases or database servers. The platform 118 may include one or more APIs (not shown) to suitably communicatively couple components of the platform 118.

In some embodiments, the longevity fund 134 may be offered by the fund manager 102 as a mutual fund, and a system such as Fundserv may be used to facilitate buying and selling of units of the mutual fund.

The investor onboarding layer 132 of the direct channel investor module 118 may interface with the device 124 of the prospective investor to obtain investor information. The investor module 118 and/or fund manager module 128 may determine based on the information whether the investor is eligible to obtain shares of the fund 134. The investor module 118 may enable the investor device to purchase shares of the fund 134, or may do so indirectly via the fund manager module 128. In one example embodiment, the direct channel investor module 118 may carry out investor onboarding using the method shown in FIG. 3.

Such method may begin by receiving an investment request from an investor (step 200). Next, the module 118 may determine whether the investor is a new investor (step 202), such as by the investor onboarding layer 132 prompting the investor to provide identity data, and then comparing the investor identity against information stored in the database 150 and/or internal or external databases or database servers (not shown), collectively referred to as database(s). If the investor is not a new investor, the appropriate share class based on information present in the database(s) such as, for example, investor age and gender, can be determined by the fund manager module 128 and/or the direct channel investor module 118 (step 210*a*). Next, at step 212*a*, the desired number of units, or shares can be issued to the investor. The direct channel investor module 118 may be configured such that an existing investor may login to a client portal to place additional purchases.

If, at step 202, it is found that the investor is a new investor, the investor onboarding layer 132 may walk the investor through a series of questions to obtain from the investor device 124 information such as, for example, investor age and gender (step 204). By comparing the investor information to established criteria, the platform 118 can determine whether the investor fits into one of one or more cohorts (step 206). The cohorts can be defined based on age and gender, since such criteria may enable the fund manager module 128 to utilize empirical mortality data/mortality tables in projecting fund returns. The cohorts may be defined such that the investor may only fit into one cohort. A plurality of share classes may further divide investors based on criteria including, but not limited to, minimum investment or account balance and investor risk appetite.

For example, an investor capable of investing or having an account balance of at least $5000 may be eligible for "Class A" shares, whereas "Class F" shares may require a lower minimum investment or account balance, such as $500. In one example embodiment, the fund may include two cohorts and a plurality of share classes divided according to gender and age as shown in Table 1.

TABLE 1

| Cohort | Class | Date of Birth Range |
|---|---|---|
| Cohort 1 | Class A1 | Males: Jan. 1, 1954 to Dec. 31, 1956 |
| | Class F1 | Females: Jan. 1, 1952 to Dec. 31, 1954 |
| Cohort 2 | Class A2 | Males: Jan. 1, 1951 to Dec. 31, 1953 |
| | Class F2 | Females: Jan. 1, 1949 to Dec. 31, 1951 |

There may also be one or more accumulation cohorts whereby individuals below a certain cut-off age such as, for example, 65 years old, are eligible to invest in the fund. Such accumulation cohorts may automatically convert to decumulation cohorts when the individuals therein reach a certain age, e.g., the cut-off age.

The fund may have an unlimited number of classes of units and may issue an unlimited number of units of each class. When required or desired, the size of the fund may be temporarily or permanently limited by restricting new purchases, while continuing redemptions and the calculation of the fund's NAV, by e.g., the financial modeling software 140, for each class of units.

Returning to FIG. 3, if, at step 206, the prospective investor qualifies i.e., fits into one of the defined cohorts, the method can move to step 208 and the database(s) can be updated with the investor's information. The investor can then select from share classes for which they are eligible based on further criteria such as those described above (step 210*b*). At step 212*b*, the investor can be sold the desired number of shares, and thereby enter the longevity fund 134. The direct channel investor module 118 may be in communication with investor accounts to enable the purchase of shares. Alternatively, the fund manager may obtain the investor's financial information and execute the transaction on behalf of the investor. If the prospective investor does not qualify, the process ends for the investor and they do not receive shares (step 214).

Figure 3:
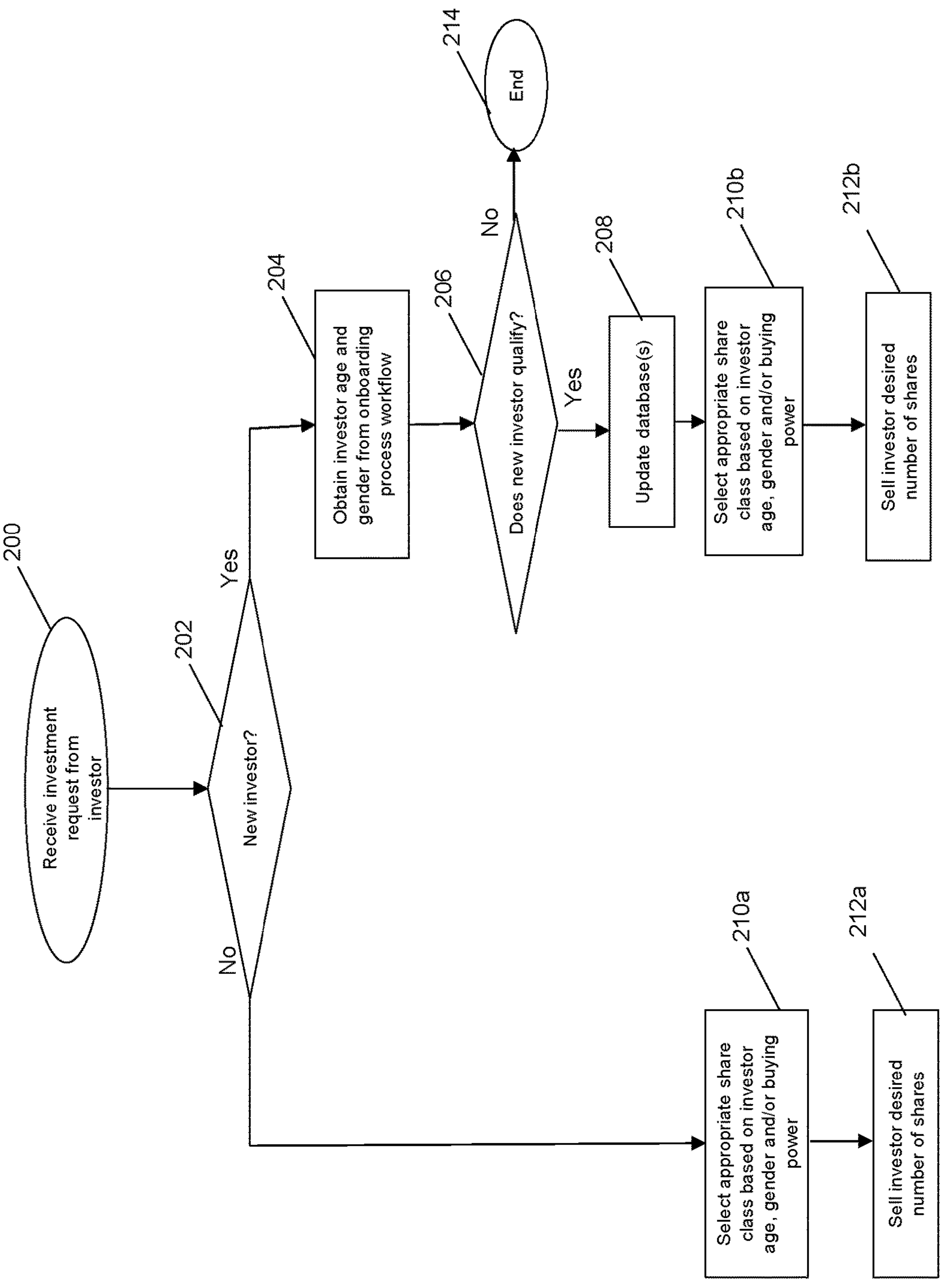
FIG. 3 is a flow chart illustrating a method for carrying out direct investor onboarding to enable direct investor participation in the system for allocation and period distribution of retirement capital.
Figure 4:
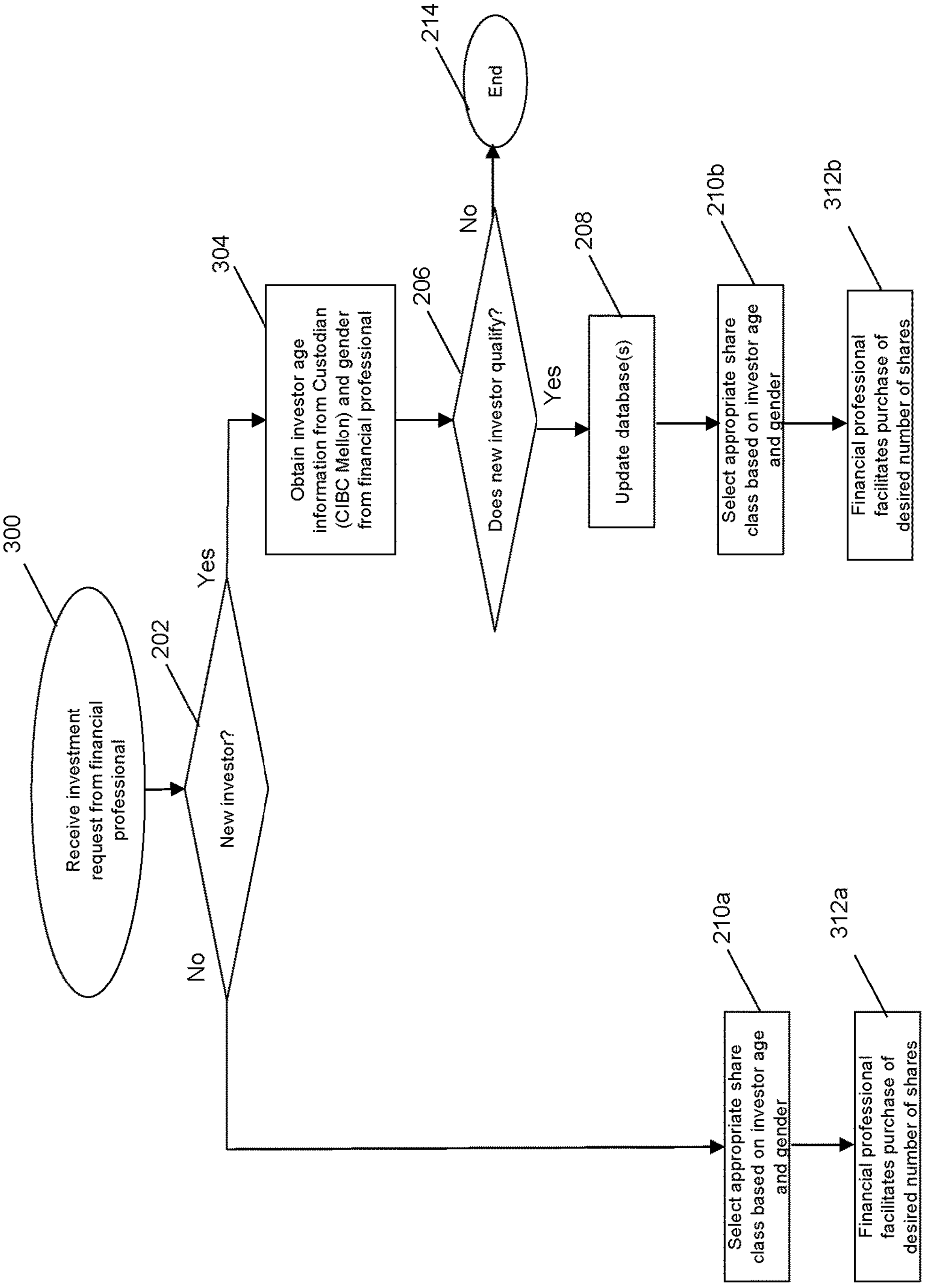
FIG. 4 is a flow chart illustrating a method for enabling financial professionals to initiate investor participation in the system for allocation and period distribution of retirement capital.
Figure 5:
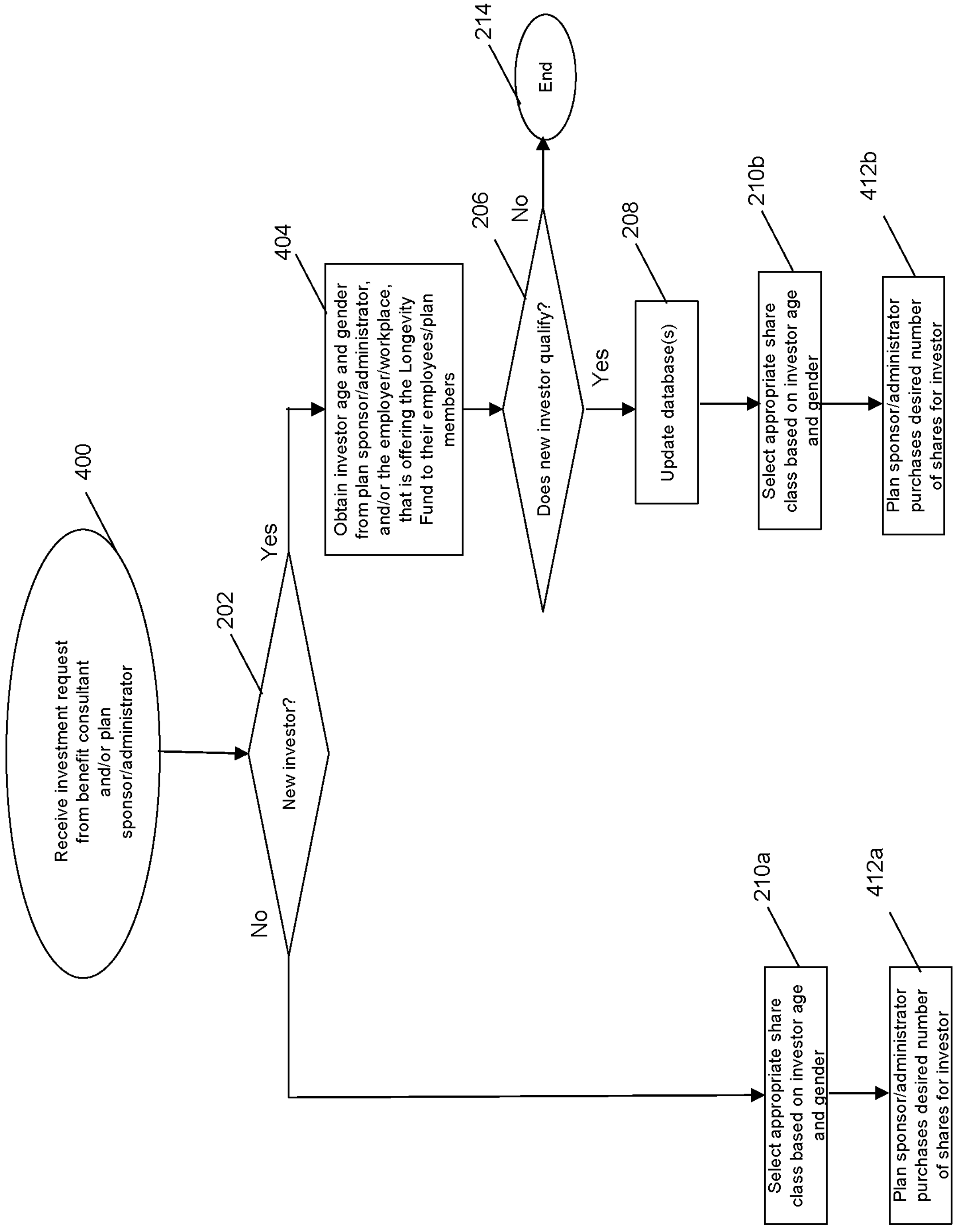
FIG. 5 is a flow chart illustrating a method for enabling institutions to initiate investor participation in the system for allocation and period distribution of retirement capital.

The method of FIG. 3 can be modified at step 204 depending on whether direct investors, benefits consultants, benefit plan sponsors/administrators, or financial professionals are making the request for one or more investors to participate in the longevity fund. For example, if a financial professional is facilitating an investment, via a financial professional device 201 shown in FIG. 2, the financial professional may initiate the process (step 300) as shown in FIG. 4. The method may differ from that shown in FIG. 3 at steps 204 (304) and 212 (312) since the financial professional is acting for the investor. At step 304, the financial professional may provide gender and age information to the fund manager. Alternatively, investor age may be obtained from the custodian 150. At steps 312*a* and 312*b*, the financial professional may facilitate the purchase of the desired number of shares. The method shown in FIG. 5 differs from the method shown in FIG. 3 in similar fashion, since a plan sponsor/administrator may initiate the process (step 400). Investor information may be obtained at step 404 from, for example, the plan sponsor/administrator device 301 and/or the employer/workplace (not shown) that is offering access to the longevity fund to their plan members or employees, respectively. At steps 412*a* and 412*b*, the plan sponsor/administrator may purchase a desired number of shares for the investor.

The components within the platform 118 are shown in isolation for ease of illustration, but may include suitable communication connections therebetween, such as those discussed herein and others that are not discussed herein. In some example embodiments, the computing platform may include financial professional and/or plan sponsor/administrator modules to interface with devices 201 and 301 for interacting with the fund manager module 128 in a manner similar to the direct channel investor module 118. In other example embodiments, the system may not include a direct channel investor module and investors may not have direct access to the computing platform 118. In such case, an individual investor may purchase shares of the fund by contacting the fund manager directly.

The pooled capital, or fund, may implement mechanics similar to annuities to provide the participants within each cohort lifetime income. A projected starting rate of return for a 65 year old may be, for example, 6% assuming 3.5% net returns in the portfolio. The model may incorporate the use of mortality tables, which are not shown herein but are widely used by pensions/insurance companies in Canada to estimate financial exposure. The platform may receive 3 rd party actuarial data from, for example, a consulting firm. Based on such data, mortality rates of individuals in the cohorts can be projected, and distribution payments calculated. As mentioned, in contrast to the "winner take all" style of traditional longevity risk approaches (e.g. the traditional tontine concept), most of or all unpaid capital may be returned to an investor following their death. Any returns that were generated from the unitholders' investment may be kept within the cohort for the remaining investors to help fund their periodic payments.

Additionally, an investor may redeem units at it any time, or units may be redeemed by the fund manager on receipt of notice of an investor's death. In some embodiments, in the event of a redemption, the fund manager may pay proceeds of redemption in cash for each unit, or share so redeemed in an amount per unit equal to the lesser of: (i) the original purchase price of each unit redeemed less the aggregate of all cash distributions paid in respect of such units prior to the redemption date; and (ii) the net asset value ("NAV") per unit of the class of units redeemed as of such redemption date less any costs associated with the redemption, including commissions, wire transfer fees and such other costs that may have been charged to the fund manager by third parties, and in the case of a voluntary redemption, less a redemption fee equal to the percentage of the aggregate purchase price of the redeemed units.

Redemptions of units may be permitted in certain minimum amounts. In some embodiments, redemption requests for units of the longevity fund must be for a minimum amount of, for example, at least $1,000, unless the account balance is less than $1,000. There may be a minimum required balance for the longevity fund or a particular class, and in some example embodiments, if an investor's balance falls below such amount, the fund may redeem or switch the investor's units.

Figure 6:
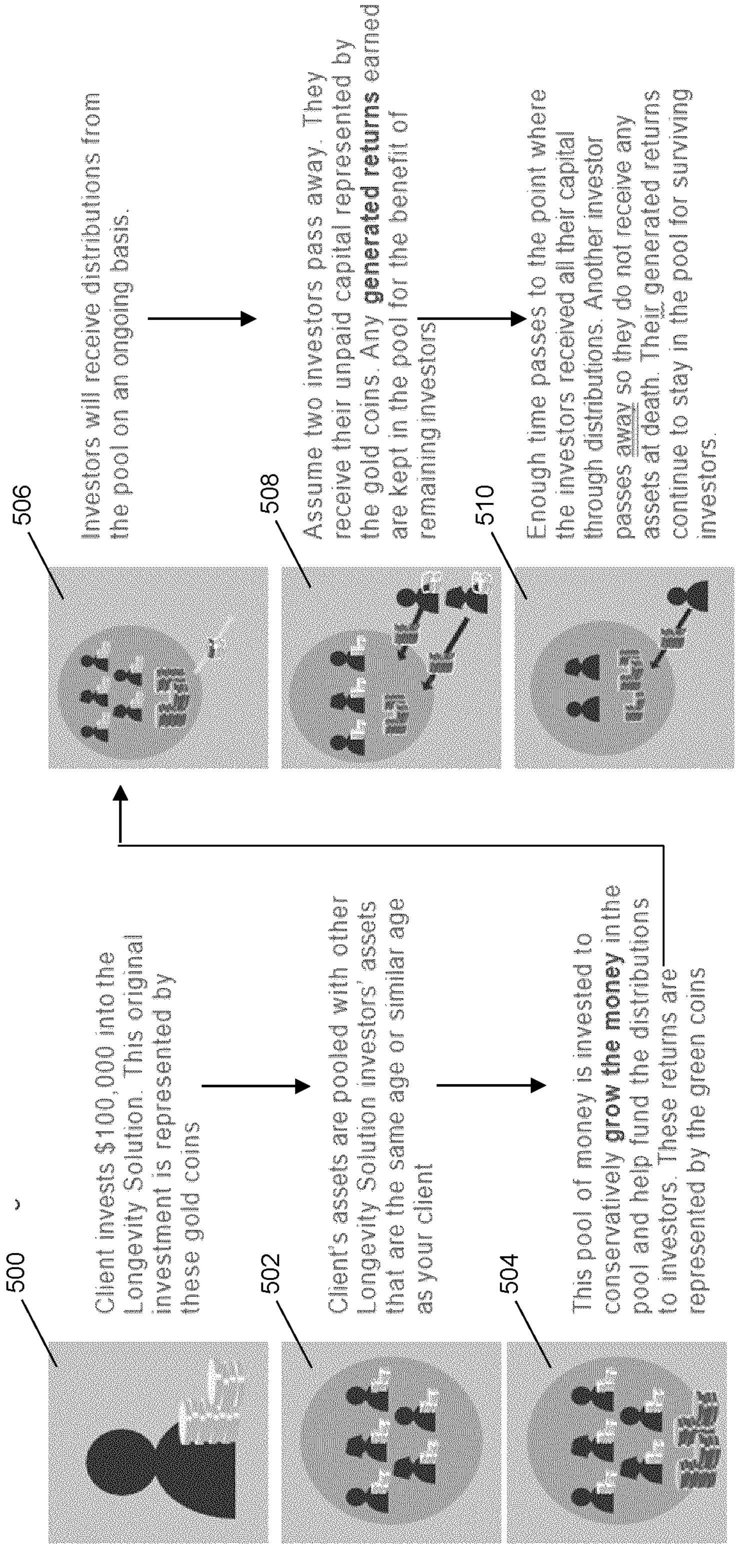
FIG. 6 is a flow chart illustrating investment, distribution and redemption in an example embodiment of a method for allocation and period distribution of retirement capital.

Turning to FIG. 6, illustrated is a flow diagram illustrating a general example embodiment of the functioning of the longevity fund. As shown, an investor may invest $100,000 (step 500) into the longevity fund at, for example, age 65. The investor's assets may then be pooled with other longevity fund investors' assets (step 502). The pool of money may then be invested to grow the money and assist in funding the distributions to investors (step 504). The money may be invested conservatively (i.e., using a low risk strategy). In this example embodiment, the income target is at 6%. As illustrated at step 506, the investors may receive 6% annually ($6,000 per year or $500/month with $100,000 investment). In this example embodiment, the ending balance of year 1 would thus be $97,500 ($100,000 starting investment, minus the $6,000 distribution, plus $3,500 in investment returns). In the event the investor passes away, the investor would receive $94,000 ($100,000 less the $6,000 distribution). The remaining $3,500 may be kept in the same cohort for the remaining investors and shared on a pro-rata basis. Steps 508 and 510 in FIG. 6 illustrate a possible outcome of investors passing away before and after, respectively, receiving their distributions.

In another example embodiment, share class requirements and cohort information may be as shown below in Tables 2 and 3.

TABLE 2

| Class | Minimum Investment/ Account Balance | Minimum Additional Investments/Pre-authorized purchase plans/Redemptions |
|---|---|---|
| Class A1 Units, Class A2 Units, Class A3 Units, Class A4 Units, Class Accumulator A Units and Class Accumulator AT5 Units | $5,000 | $100 |
| Class D1 Units, Class D2 Units, Class D3 Units, Class D4 Units, Class Accumulator D Units and Class Accumulator DT5 Units | $5,000 | $100 |
| Class F1 Units, Class F2 Units, Class F3 Units, Class F4 Units, Class Accumulator F Units and Class Accumulator FT5 Units | $5,000 | $100 |

TABLE 2-continued

| Class | Minimum Investment/ Account Balance | Minimum Additional Investments/Pre-authorized purchase plans/Redemptions |
|---|---|---|
| Class I1 Units, Class I2 Units, Class I3 Units, Class I4 Units, Class Accumulator I Units and Class Accumulator IT5 Units | $100,000 | $100 |
| Class O1 Units, Class O2 Units, Class O3 Units, Class O4 Units, Class Accumulator O Units and Class Accumulator OT5 Units | $100,000 | $100 |

TABLE 3

| Cohort/Class Type | Date of Birth Ranges | Class | Initial Lifetime Income Target for Purchases Made in 2021 | Closed for New Purchases (estimated) |
|---|---|---|---|---|
| Decumulation Cohort 1 | Jan. 1, 1954 to Dec. 31, 1956 | Class A1<br>Class D1<br>Class F1<br>Class I1<br>Class O1 | 5.65%<br>6.15% | 2036 |
| Decumulation Cohort 2 | Jan. 1, 1951 to Dec. 31, 1953 | Class A2<br>Class D2<br>Class F2<br>Class I2<br>Class O2 | 6.00%<br>6.50% | 2033 |
| Decumulation Cohort 3 | Jan. 1, 1948 to Dec. 31, 1950 | Class A3<br>Class D3<br>Class F3<br>Class I3<br>Class O3 | 6.40%<br>6.90% | 2030 |
| Decumulation Cohort 4 | Jan. 1, 1945 to Dec. 31, 1947 | Class A4<br>Class D4<br>Class F4<br>Class I4<br>Class O4 | 6.90%<br>7.40% | 2027 |
| Accumulation | Eligible for individual investors of any age outside of the date of birth ranges listed above. | Class Accumulator A<br>Class Accumulator D<br>Class Accumulator F<br>Class Accumulator I<br>Class Accumulator O<br>Class Accumulator AT5<br>Class Accumulator DT5<br>Class Accumulator FT5<br>Class Accumulator IT5<br>Class Accumulator OT5 | N/A | N/A |

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A computing system implemented on a computing platform for allocating and periodically distributing invested pooled capital between a plurality of investors, the system comprising:

at least one computing device comprising one or more processors and a memory for storing instructions, wherein when the one or more processors execute the instructions stored in the memory, the executed instructions cause the system to:

(i) receive investor-specific data from a plurality of investor devices via a communication interface of an investor module that communicates with the plurality of investor devices; wherein the investor-specific data comprises at least one of age, gender, and investor type associated with each investor;

(ii) assign each investor of the plurality of investors to one of a plurality of cohorts based on the received investor-specific data to create a cohort assignment for each investor;

(iii) store the investor-specific data and the cohort assignments in a database (iv) access pooled capital data associated to one or more pooled investment funds from a custodian database;

(v) obtain investor mortality data for the plurality of investors, wherein the investor mortality data comprises projected mortality values for investors in each cohort assignment based on the investor-specific data;

(vi) determine an allocation value for each investor of the plurality of investors for a distribution period based on application of a distribution model that uses pooled capital data, the cohort assignment for each investor, and the investor mortality data;

(vii) generate distribution instructions, wherein the distribution instructions specify the amount of pooled capital funds to be distributed to each investor based on the allocation values; and (viii) transmit the distribution instructions to one or more administrator devices to execute the distribution of the pooled capital funds;

wherein the system periodically distributes pooled capital funds using the investor data and investor mortality data and based on investment returns.

2. The computing system of claim 1, wherein the administrator module is configured to receive data from actuarial software configured to analyze the investor data and project mortality of the investors as investor mortality data.

3. The computing system of claim 1, wherein the investor module is configured to interact with investor devices via the communication interface, and the investor module is configured to prompt investor devices to input the investor data to populate the database.

4. The computing system of claim 1, wherein the computing platform is configured to automatically sort each investor into a plurality of cohorts based on the investor data.

5. The computing system of claim 4, wherein the investor module is configured to carry out the automatic sorting of the investors into cohorts.

6. The computing system of claim 4, wherein the cohorts are defined based on investor age and/or gender.

7. The computing system of claim 5, wherein the cohorts are defined based on investor age and/or gender.

8. The computing system of claim 1, wherein the pooled capital is invested in a fund holding units of another fund or a plurality of financial instruments.

9. A computer-implemented method for allocating and periodically distributing invested pooled capital between a plurality of investors, the method comprising the steps of:

(a) providing a computing system comprising at least one computing device, which comprises one or more processors and a memory for storing instructions;

(b) receiving investor-specific data from a plurality of investor devices via a communication interface of the at least one computing device that communicates with the plurality of investor devices; wherein the investor-specific data comprises at least one of age, gender, and investor type associated with each investor, (c) using the at least one computing device, assigning each investor of the plurality of investors to one of a plurality of cohorts based on the received investor-specific data to create a cohort assignment for each investor, (d) storing the investor investor-specific data and the cohort assignments in a database;

(e) accessing pooled capital data associated to one or more pooled investment funds from a custodian database, wherein the pooled capital data relates to pooled capital funds;

(f) obtaining investor mortality data for the plurality of investors, wherein the investor mortality data comprises projected mortality values for investors in each cohort assignment based on the investor-specific data;

(g) generating allocation parameters for each investor for a distribution period by application of a distribution model that uses the pooled capital data, the cohort assignment for each investor, and the investor mortality data;

(h) determining an allocation value for each investor by applying the allocation parameters to the pooled capital data for the distribution period;

(i) generating distribution instructions, wherein the distribution instructions specify the amount of pooled capital funds to be distributed to each investor based on the allocation values; and (j) transmitting the distribution instructions to one or more administrator devices to execute the distribution of the pooled capital funds;

wherein the foregoing steps are performed periodically to provide automatic distribution of pooled capital funds using the investor data and investor mortality data and based on investment returns.

10. The method of claim 9, wherein the administrator module is configured to receive data from actuarial software configured to analyze the investor data and project mortality of the investors as investor mortality data.

11. The method of claim 9, wherein the investor module is configured to interact with investor devices via the communication interface, and the investor module is configured to prompt investor devices to input the investor data to populate the database.

12. The method of claim 10, wherein the investor module is configured to interact with investor devices via the communication interface, and the investor module is configured to prompt investor devices to input the investor data to populate the database.

13. The method of claim 12, wherein the computing platform is configured to automatically sort each investor into a plurality of cohorts based on the investor data.

14. The method of claim 13, wherein the investor module is configured to carry out the automatic sorting of the investors into cohorts.

15. The method of claim 13 wherein the cohorts are defined based on investor age and/or gender.

16. The method of claim 14 wherein the cohorts are defined based on investor age and/or gender.

17. The method of claim 9, wherein the pooled capital is invested in a fund holding units of another fund or a plurality of financial instruments.

18. A computing system for allocating and periodically distributing invested pooled capital between a plurality of investors, the system comprising:

at least one computing device comprising at least one processor and a memory for storing instructions;

a database configured to store investor data;

a custodian database configured to store pooled capital data related to pooled capital funds;

an investor interface configured to receive investor-specific data from a plurality of investor devices, wherein the investor-specific data comprises at least one of age, gender, and investor type associated with each investor, and an administrator interface configured to communicate with at least one administrator device;

wherein when the at least processor executes the instructions stored in the memory of the at least one computing device, the executed instructions cause the system to:

(i) receive the investor-specific data from the investor devices via a communication the investor interface;

(ii) store the investor investor-specific data in the database;

(iii) assign each investor to one of a plurality of cohorts based on the investor-specific data, wherein the cohort assignments are stored in the database;

(iv) access pooled capital data stored in the custodian database;

(v) generate investor mortality data using the investor-specific data (vi) generate allocation parameters for a distribution period based on pooled capital data, cohort assignments, and the mortality data for the plurality of investors;

(vii) determine an allocation value for returns of pooled capital funds to each investor based on application of the allocation parameters to the pooled capital data;

(viii) generate distribution instructions, wherein the distribution instructions specify the amount of pooled capital funds to be distributed to each investor based on the allocation values; and (ix) transmit distribution instructions to the at least one administrator device for execution of the distribution;

wherein the instructions are executed periodically to distribute, pooled capital funds based on investment returns and the investor mortality data for the plurality of investors.

19. The computing system of claim 1, further comprising an administrator module comprising an interface for communicating with the administrator devices.

* * * * *